United States Patent [19]

Chen

[11] 4,201,699
[45] May 6, 1980

[54] PHENOL-ALDEHYDE RESIN COMPOSITION CONTAINING PECAN PITH EXTRACT AND AN ALDEHYDE

[76] Inventor: Chia-Ming Chen, 205 Dove Valley Dr., Athens, Ga. 30606

[21] Appl. No.: 814,920

[22] Filed: Jul. 12, 1977

[51] Int. Cl.$^2$ .................... C08G 83/00; C08L 61/06; C08L 61/10; C08L 61/14

[52] U.S. Cl. ..................... 260/7; 260/17.2; 525/414; 528/1; 528/3

[58] Field of Search ............... 260/46, 17.2, 7, 838; 528/1; 525/414

[56] References Cited

U.S. PATENT DOCUMENTS

| | | | |
|---|---|---|---|
| 2,645,623 | 7/1953 | Hermann | 260/46 |
| 2,782,241 | 2/1957 | Gray et al. | 528/1 |
| 3,062,783 | 11/1962 | Gray et al. | 528/1 |
| 3,093,604 | 6/1963 | Ayers | 260/17.3 |
| 4,098,765 | 7/1978 | Kays et al. | 528/1 |

OTHER PUBLICATIONS

Chem. Absts. vol. 54 (1960), 14801a, Lewin et al, Phenol–Formaldehyde Adhesives.

*Primary Examiner*—Edward M. Woodberry
*Attorney, Agent, or Firm*—Sherman & Shalloway

[57] ABSTRACT

A phenol-aldehyde resin composition consisting essentially of the polymerization product of an alkali organic extract of peanut hulls and pecan piths polymerized with an aldehyde. The peanut hull and pecan pith alkali organic extract are polymerized with an aldehyde and used to formulate resins suitable for use in polywood adhesives, in molding compounds, in wood bonding agents and in cellulosic material impregnating agents.

20 Claims, No Drawings

PHENOL-ALDEHYDE RESIN COMPOSITION CONTAINING PECAN PITH EXTRACT AND AN ALDEHYDE

BACKGROUND OF THE INVENTION

1. Field of the Invention

This invention relates to extracts from peanuts hulls and pecan pith, processes for such extraction, the use of the extract for the preparation of phenolic-type resins, and the use of such resins in adhesives and as bonding agents for wood laminates, particle board, and the like.

2. Description of Prior Art

For many years agricultural residues, such as tree bark, sawdust, peanut hulls, and pecan pith, were regarded as waste products to be disposed of as cheaply as possible. However, in this era of material shortages and ecological awareness, increasing efforts have been directed away from mere disposal and toward positive utilization of such residues. Although most of such residues are still disposed of by burning or dumping, increasingly stringent air and water pollution regulations coupled with the high potential value they may have as raw materials suggests that maximum utilization of the residues is a necessity.

The use of various tree barks, especially pine, oak and redwood, and other residues, such as oat hulls, walnut shells, wood flour, and coniferous strobiles, as extenders or fillers for phenol-aldehyde resins is well known. It is also known to make alkali extracts of various tree barks and to use such alkali extracts in phenol-aldehyde resin production.

There has, however, been no disclosure of the production of alkali extracts of peanut hulls or pecan piths or the use of such extracts as a partial or complete substitute for phenol in phenol-aldehyde condensation under alkaline conditions.

Relevant prior art of which the applicant is aware is as follows:

U.S. Pat. No. 1,078,893 relates to extracting tannin from pecan shells and pith. The disclosed process consists of comminuting pecan shells and pith, mixing them with boiling water, and extraction by percolation. There is no disclosure of the use of an alkaline solution.

U.S. Pat. No. 2,574,784 relates to a phenolic resin adhesive composition containing a comminuted bark extender.

U.S. Pat. No. 2,574,785 relates to a process for treating vegetable shell material for use as a constituent of phenolaldehyde adhesive compositions. The vegetable shell materials specifically disclosed are nut shells, such as walnut, filbert and hickory, the endocarps (stones) of drupes, such as apricot, peach and prune, and the barks of trees.

U.S. Pat. No. 2,675,336 discloses a phenolic resin especially adapted for use in the manufacture of plywood which is the reaction produce of phenol, alkaline redwood bark extract, and formaldehyde. The use of more than 50% alkali soluble redwood bark extract by weight in the phenolic component is disclosed as resulting in resins of substantially reduced reactivity. Wood flower, walnut shell flour, and pulverized oat hulls are disclosed as fillers.

U.S. Pat. No. 2,773,847 discloses the reaction of tree bark fractions with an alkaline compound which is then further reacted with an aldehyde to form a resin. It is disclosed that bark fractions comprising less than about 68% cork prove to be unsatisfactory as the principal ingredients in a causticformaldehyde bark adhesive.

U.S. Pat. No. 2,781,286 relates to phenolic resin glue compositions containing extenders, which are finely divided modified vegetable shell materials containing certain alkali derivatives. Vegetable shell materials disclosed are the endocarps of drupes, which include shells of nuts, such as walnut, hickory, palm and filbert, pit shells of fruits, such as peach, prune and apricot, the hulls of grains and seeds, such as oat hulls, and the cones or strobiles of coniferous trees.

U.S. Pat. No. 2,782,241 relates to the digestion of coniferous barks in an aqueous alkaline solution so as to convert part of the water-insoluble portion of the bark to a water-soluble alkali derivative.

U.S. Pat. No. 2,819,295 is similar to U.S. Pat. No. 2,782,241 but relates to a different fraction of the organic chemicals of the bark and is further characterized by retained or combined nitrogen.

U.S. Pat. No. 2,823,223 relates to an improved process for the production of chemical derivatives from coniferous barks by digestion in an aqueous ammonia solution.

U.S. Pat. No. 2,831,022 relates to sodium sulfonate or sulfonic acid derivatives of polymeric phenolic materials occurring in bark and the use of such compositions as chemical intermediates and well drilling additives.

U.S. Pat. No. 3,008,907 relates to an extender for phenolic resins which is an alkali metal reaction product of a conjointly cooked alkaline mixture of a cereal flour and a vegetable material which may be ligno-cellulose. The disclosed cereal flour is wheat flour. The disclosed ligno-cellulose materials are tree bark, nut shells, and the endocarps of drupes.

U.S. Pat. No. 3,017,303 relates to extenders for phenolic resin adhesives which are naturally occurring ligno-cellulose and alkali lignin.

U.S. Pat. No. 3,025,250 relates to phenolic resins which are further reacted with alkali-bark derivatives obtained by treating suitable bark at a temperature of from about 90° to 170° C. with an aqueous alkaline solution.

U.S. Pat. No. 3,053,784 relates to resins derived from a sodium salt of a polymethylol phenol and a sodium substituted bark derivative. It is one of the important aspects of this invention that free formaldehyde is neither present in nor added to the composition.

U.S. Pat. No. 3,093,605 relates to extenders for plywood adhesive solutions composed of a vegetable shell flour extender and minor amounts of an at least partially oxidized extracted lignin and a non-fibrous degradation product of a vegetable shell material.

U.S. Pat. No. 3,093,607 is closely related to U.S. Pat. No. 3,093,605.

U.S. Pat. No. 3,099,633 is closely related to U.S. Pat. No. 3,093,605.

U.S. Pat. No. 3,213,045 relates to phenolic resin adhesives formulated with redwood bark dust resin extenders.

U.S. Pat. No. 3,223,667 discloses a resin composition comprising an alkali-bark derivative and a polymethylol phenolic compound which will polymerize to a phenolic resin and will also condense with the alkali-bark derivative.

U.S. Pat. No. 3,232,897 relates to resorcinol-formaldehyde cold setting adhesive resins incorporating alkali-bark derivatives as an extender.

U.S. Pat. No. 3,268,460 relates to condensing phenol and aldehyde to make a resinous condensate and then further condensing said resin with bark flour.

U.S. Pat. No. 3,293,200 relates to phenol resins containing, as an extender, a water-insoluble, finely-divided humin material obtained from the manufacture of levunic acid by acid hydrolysis of ligno-cellulose.

U.S. Pat. No. 3,328,322 relates to thermosetting molding materials comprising a phenol-aldehyde resin and an alkali-extracted douglas fir bark fiber.

U.S. Pat. No. 3,371,054 relates to alkali-bark derivatives produced by treating bark with an alkali metal hydroxide in strong aqueous solution which is heated sufficiently to carry the batch to a substantially dry state while in a non-oxidizing atmosphere, to form an alkali bark. The alkali bark may be acidified to form an acid bark. Either the acid bark or the alkali bark may be reacted with formaldehyde to form novolak-type or resole-type resins.

U.S. Pat. No. 3,389,101 relates to a resin adhesive for use in the manufacture of plywood which is formulated from a redwood extract composed of phenolics which are solvent-extracted from redwood, and phenol co-reacted with formaldehyde in the presence of an alkali hydroxide catalyst.

U.S. Pat. No. 3,429,770 relates to an extender for plywood glue compositions.

U.S. Pat. No. 3,518,210 discloses an infusable resin formed by reaction of a phenol-aldehyde condensation product with an alkali-bark derivative.

U.S. Pat. No. 3,654,200 relates to a liquid coniferous tree bark alkali which is reacted with a dimethylol amide of a dibasic acid and used as a substitute for up to 65% of phenol-formaldehyde in adhesive resin formulae.

U.S. Pat. No. 3,931,071 relates to lignin sulfonate-phenol formaldehyde glue systems for particle board, hardboard and plywood.

Japanese laid-open patent application No. 50/34054 discloses the use of peanut hulls as an extender in phenol-formaldehyde resin adhesives for use in plywood manufacture.

Relevant literature includes the following.

Kottwitz and Forman, *Sodium Palconate*, Industrial and Engineering Chemistry, Volume 40, No. 12 (1948), pages 2443-2450. This article discloses the production of powdered sodium palconate by alkaline extraction of redwood bark dust followed by concentration and spray drying of the extract. The alkali-soluble material was disclosed as consisting mainly of a partially methylated phenolic acid containing aliphatic hydroxyls, phenolic hydroxyls, and carboxyl groups, in the ratio of 2:4:3.

Kulvik, *Chestnut Wood Tannin Extract in Plywood Adhesives*, Adhesives Age, March (1976), pages 19-21. This discloses a phenol-formaldehye resin in which up to 50% of the phenol is replaced by a chestnut wood tannin extract added prior to the reaction with formaldehyde.

Kulvik, *Chestnut, Tannin Extract as Cure Accelerator for Phenol-Formaldehyde Wood Adhesives*, Adhesives Age, March (1977), pages 33-34. Chestnut wood tannin extract is disclosed as replacing resorcinol and/or para-formaldehyde as an accelerator for the cure of alkaline phenol-formaldehyde adhesive resins and has an accelerating effect on the cure of phenolic adhesives for plywood manufacture.

Saayman and Brown, *Wattle-Base Tannin—Starch Adhesives for Corrugated Containers*, Forest Products Journal, Volume 27, No. 4, April (1977), pages 21-25. Polyphenolic bark tannin is disclosed as a substitute for resorcinol in the production of moisture-resistant corrugated board. The bark tannins of the wattle tree are stated to resemble resorcinol more closely than phenol.

Herrick and Bock, *Thermosetting Exterior-Plywood Type Adhesives from Bark Extracts*, Forest Products Journal, Volume 8, No. 10 (1958), pages 269-274.

McLean and Gardner, *Bark Extracts in Adhesives*, Pulp and Paper Magazine of Canada, Volume 53, August (1952), pages 111-114.

Abe, *Studies on the Lignin-Formaldehyde Resin*, Hokkaido Forest Products Research Institute Research Report No. 55, (1970), pages 1-131.

Hall, Leonard and Nicholls, *Bonding Particle Board With Bark Extracts*, Forest Products Journal, Volume 10, No. 5, (1960), pages 263-272.

Chen and Rice, *Veneer and Assembly Condition Effects on Bond Quality in Southern Pine Plywood*, Forest Products Journal, Volume 23, No. 10, (1973), pages 46-49.

In addition to the above, the inventor presented a paper at the thirtieth annual meeting of the Forest Products Research Society held in Toronto, Canada, on July 13, 1976, entitled "Studies On The Use of Bark and Agricultural Residue Components In Phenolic Resins and Glue Mixes—Part I—Relative Activity Of Bark and Residue Extractives Toward Formaldehyde". This paper disclosed the extraction of phenol-like compounds from southern pine bark, oak bark, pecan nut pith, and peanut hulls. Various extraction means were disclosed including aqueous sodium hydroxide extraction, sulfite pulping method extraction, and hydrolysis by means of the "Hokkaido Process" to produce lignin-like compounds. Some, but not all, of the extracted components reacted rigorously with formaldehyde.

SUMMARY OF THE INVENTION

It has been discovered that a substance can be isolated from two agricultural residues, namely peanut hulls and pecan piths, which may be reacted with aldehydes under alkaline conditions so as to form phenol-aldehyde type A and type B resins, which then may be used either alone or in admixture with other ingredients as adhesives or bonding agents, which are heat cured to type C resins. The process of extraction of the useful compounds from the peanut hulls or pecan piths is extremely important. The preferred extraction is by reaction of the peanut hulls or pecan piths residues with an alkali in an aqueous system at a temperature of from about 20° to about 400° C., under atmospheric or in elevated pressure, and for a time sufficient to react the residue with the alkali, thus producing an alkaline extract solution and/or suspension. The alkaline extract is then treated to remove non-suspended particles, after which the extract is concentrated to from 2 to 100% by weight of solids by water removal, using any conventional means. The alkaline concentrate thus produced is believed to contain various phenols and polyphenols, as well as cellulose derivatives and lignin compounds. This residue extract has been found to be an extremely useful reactant material for the production of alkaline phenolaldehyde resins.

Various types of resin polymers, copolymers and heteropolymers may be produced, depending upon the polymerization method. Some of these resins are as follows.

Resin I

The residue extract may be reacted directly with an aldehyde to form a thermosetting resin.

Resin III

A conventional type B phenol-aldehyde resin (Resin II) may be simply mixed with Resin I (when still at type B stage), and the mixture may be heat cured.

Resin III-A

Resin I and Resin II may be mixed while they are still in the precondensate stage, that is, while they are still type A or early stage type B resins, and then further reacted prior to curing with the addition of further aldehyde if necessary to produce a resin copolymer.

Resin IV

Up to 80% of the residue extract may be substituted by phenol and the mixture then reacted with an aldehyde under conventional conditions to produce a resin copolymer.

Resin V

A precondensate (type A or early stage type B) of Resin II may be further reacted with the residue extract to produce a copolymer.

The resins thus produced may be used as adhesives for the manufacture of plywood, wood veneers, or similar laminates, as well as for bonding particle board, fiber board, strip board, and similar manufactured cellulosic products. The resins may be used either as is, or with the addition of extenders, fillers, gums, etc. The bonding qualities of the adhesives and the resins were found to be greatly improved over those of conventional phenolaldehyde type resins, in that the heat curing time was significantly shorter and the bond was at least as strong and durable, if not better.

DETAILED DESCRIPTION OF THE INVENTION

1. Description of the Raw Materials

Peanut hulls are the preferred agricultural residue used in this invention. The peanut hulls may be processed without any further preparation. However, in order to minimize the amount of extracted materials, it is generally desirable to break up the peanut hulls into pieces not larger than about ⅛ inch (0.3 cm) in diameter. The peanut hulls may be reduced to particles of this size by any conventional means, such as using a hammer mill, roller mill, ball mill, etc. The peanut hulls also may be ground into a fine powder or flour, although this does not appear to increase appreciably the amount of extracted material. Peanut hulls obtained commercially may also contain minor amounts of inner skin and nut.

Pecan pith is the other agricultural residue useful in this invention. As defined herein, pecan pith means all parts of the pecan other than the kernel (nut) and outer shell. Pecan pith is obtained commercially as a coarse ground powder, and may contain minor amounts of kernel and outer shell.

2. Extraction of Useful Materials (A) Sulfite Pulping Method

One means of extracting compounds from peanut hulls and pecan pith useful in this invention is by solubilizing the compounds using sodium sulfite and then removing the waste insolubles.

As one example of such a treatment, the raw materials were digested with a liquor that was composed of 12.3% sodium sulfite and 3.0% sodium bisulfite for six and one-half hours after reaching a maximum temperature of 135° C. The solids to liquid weight ratio was 1:6. After digesting, the products were vacuum filtered through Whatman No. 4 filter paper. The filtrates were then evaporated to a non-volatile content of more than 22% by a flash evaporator.

As another example of such a treatment, the same process as above was repeated except that the liquor had a composition of 3.9% sodium sulfite and 1.0% sodium carbonate. The maximum temperature during the digestion process was 170° C.

Generally, the extractions are conducted in aqueous solutions containing from 3 to 15% sodium sulfite and at least one of the group consisting of from 2 to 5% sodium bisulfite and from 0.5 to 2% sodium carbonate at temperatures of from about 100° to 200° C., until at least 2%, preferably from about 5 to about 15%, by weight of crude protein is contained in the extract, based upon 100% by weight of total reacted organic compounds.

(B) Alkaline Extraction Method

As a preferred method of extracting useful compounds from peanut hulls and pecan pith, the agricultural residue may be reacted with an alkali in a solvent system, so as to make the desired compounds soluble in that system. Any alkali which will react with these compounds may be used in such a process. However, sodium hydroxide, potassium hydroxide, and ammonium hydroxide are preferred, with sodium hydroxide being most preferred. Any type of organic or inorganic solvent can be used, provided that it can dissolve the alkali salt that is formed. However, as a practical matter, an aqueous system is most preferred.

The extraction process can be performed in one stage, or as many as three stages, with a two-stage extraction process being preferred. The extraction process can be conducted at room temperature by immersion of the residue in the alkali medium for a sufficient length of time, usually from 24 to 72 hours.

Where the extraction is to be conducted in one stage, the speed of extraction can be increased noticeably simply by increasing the temperature and/or alkalinity of the aqueous alkaline medium. For this purpose, temperatures of from 20° to about 400° C., preferably from 20° to about 300° C., and most preferably from about 40° to about 100° C., may be used. Normally, the extraction may be conducted under atmospheric pressure. However, if desired, the extraction process may be further speeded up by sealing the container or by increasing the pressure, which in effect "pressure cooks" the residues. When the extraction is conducted in one stage, the solid:liquid ratio should be from 1:4 to 1:30, preferably from 1:10 to 1:20. The alkali concentration in weight percent may be from 5 to 50% for ammonium hydroxide and from 1 to 30% for sodium hydroxide or potassium hydroxide. Preferable concentrations are from 2 to 20 weight percent, and most preferable are from 2 to 10 weight percent for sodium and potassium hydroxide, and from 7.5 to 30 weight percent for ammonium hydroxide.

A multistage extraction process is also possible, with a three-stage process being preferred and a two-stage process being most preferred. In a multistage extraction process, the process of the one-stage extraction is simply repeated until all useful materials are removed. Generally, the solids:liquids weight ratio is decreased for each additional stage. The solids:liquids weight ratio for the first stage should be from 1:2 to 1:15, with ratios of 1:5 to 1:10 being preferred. The solid:liquid ratio for the second stage can be the same, but it is also possible to reduce the liquids up to fifty percent, with the proviso that the total solid:liquid ratio for both stages added cumulatively is at least 1:5. It is also possible to reduce the solids:liquids weight ratio for the first stage with the same proviso applying.

It has been found that a three-stage extraction process does afford some additional yield, but this is generally not sufficient to warrant the increased expenditure of energy. Therefore, a two-stage process is preferred.

When the extract is used per se as a bonding agent for wood particles, it generally is desirable to remove any residue remains which are not suspended in the extract. These residue remains may be removed by any conventional process, such as screening, filtering, or simply decanting the supernatant liquid containing the solubilized extract and fine particles in suspension. The primary reason for removing such residue remains is because, in the production of particle board, strand board, and the like, the bonding agent is sprayed onto the particles and the presence of residue tends to clog the sprayer nozzle. Where the resin is applied by other means, removal of the residue remains may not be necessary. Where the resin is used as an adhesive ingredient for wood lamination, removal of the residue remains is not necessary, and in fact, the residue remains may constitute part of the filler conventionally used in such adhesives.

The extraction process, regardless of the method used, is to continue until at least 2%, preferably 5 to 15%, by weight of crude protein, based upon 100 weight percent of extracted organic substances, is obtained. The most convenient method for measuring the crude protein is by conventional nitrogen analysis. One of the major advantages of resins prepared in accordance with this invention over conventional phenolic resins and over resins prepared using alkaline tree bark extracts is that the resins of this invention thermoset significantly faster and, therefore, significantly reduce the time required to produce glued wood products, resulting in significant savings in energy consumption and equipment costs.

The alkaline filtrate or the alkaline extract may then be concentrated for purposes of storage or ease of handling. The concentration may be by any conventional means in which the desired amount of water is removed. Generally, it is desired to concentrate the alkaline extract or filtrate to from 2 to 100%, preferably from 40 to 60%, by weight of solids. It also may be desirable to remove substantially all of the water by a technique such as spray drying, to produce a stable dry powder which may be dissolved and/or suspended in water when desired. Where a resin is to be produced from the extract in a continuous flow system, it is generally preferable to concentrate the alkaline extract or filtrate to from 30 to 70% by weight of solids and use the concentrate directly in the next step of the production process.

3. Preparation of Resins

The extracts have been found to be useful as a partial or total substitute for phenol in conventional phenol-aldehyde polymerization under alkali conditions. Such polymerization will produce a thermosetting resin which can be used as a molding compound, adhesive, bonding agent, or ingredient of molding compounds, adhesives, or bonding agents, and the like.

Phenol-aldehyde resins were one of the first thermosetting resins produced commercially. These resins generally can be divided into three distinct stages in the condensation reaction of phenol with aldehyde in alkaline solution. The initial product, type A, is a liquid or semisolid and is converted by continued heating into an intermediate, type B, a relatively insoluble fusible solid. This, when subjected to heat and pressure, is converted (cured) into type C, an insoluble and infusible resin. In the general process of manufacture of plywood, wood veneers, laminates, strip board, and particle board, a type B resin is used and is converted to a type C resin under the influence of heat and pressure when the finished product is produced. Acid, as opposed to alkaline, conditions generally result in production of a noncurable type of resin commonly known as a novolak, with accompanying consumption of a high percentage of phenol. In an alkali medium, more aldehyde is utilized, even though an excess of phenol is employed, and the product is not of the novolak type. However, if the phenol is replaced by a substituted phenol containing only one free active position, for example 2,4-xylenol, only a noncurable novolak resin can be obtained. If the phenol has two free active positions, for example ortho- or para-cresol, partially or slowly curable resins are obtained. Thus, it is generally believed that two or three reactive positions must be available for formation of truly thermosetting resins. Since thermosetting resins are desired in the subject application, any phenol which has at least two, preferably three, reactive positions will be suitable.

Commercially, the mole ratio of formaldehyde to phenol is usually 1.5–3:1. It is believed that type A resins are similar in structure to novolaks, but more highly substituted. Such a multifunctional chain polymer would readily undergo condensation to a three dimensional structure. This accounts for the physical characteristics of type C resins, which are completely insoluble in all conventional solvents.

The phenols which may be replaced entirely or in part by the extract concentrate include all those will normally are suitable for a reaction with an aldehyde to form a phenol-aldehyde type resin. These include generally alkyl phenols, polynuclear phenols, alkylene-bridge-linked phenols, fused phenols, hydroquinones, cresols, naphthols, resorcinols, xylenols, bisphenols, and more specifically, phenol, naphthol, cresol, resorcinol, xylenol, $C_{1-5}$ alkyl phenols, halophenols, nitrophenols, cyclophenols, and the like. The preferred phenols used in phenol-aldehyde condensations for which the alkaline concentrate can be substituted or which can be replaced by the alkaline concentrate are phenol, cresol, xylenol, cresylic acid, resorcinol, naphthol, $C_{1-5}$ alkyl phenols, polynuclear phenols, fused phenols, bisphenol, halophenols, and nitrophenols. Most preferred are phenol, cresol, xylenol, and resorcinol.

The aldehydes with which the alkaline concentrate and the various phenols may be reacted include all those which are suitable for reaction with phenols to form phenol-aldehyde resins, including formaldehyde, acetaldehyde, butyraldehyde, heptaldehyde, furfuraldehyde, chloraldehyde, alpha-ethyl-beta-propylacrolein, benzaldehyde, glyoxal, pyruvaldehyde, cinnamaldehyde, pyrocatechualdehyde, and the like. Preferred aldehydes are formaldehyde and the formaldehyde polymers which are capable of decomposing to furnish formaldehyde. These include formaldehyde, paraformaldehyde, trioxane, hexamethylene tetramine, furfuraldehyde, and formalin.

RESIN I is designated herein as that resin produced by complete substitution of the extract for phenol in the production of a phenol-aldehyde resin under alkaline conditions. One part by weight of solids of the alkaline concentrate is reacted with from 0.1 to 1.6 parts by weight of solids, preferably from 0.2 to 1.0 parts by weight of solids, of an aldehyde in an aqueous alkaline system at a temperature of from 30° C. to reflux, until a viscosity of from 250 to 1500 cps at 25° C. is reached, to form a resin. In one embodiment of this invention, the condensation reaction may be conducted in one step at a preferred temperature of from about 60° to about 90° C. In another embodiment of this invention, the condensation reaction may be conducted at a temperature of from about 30° to about 75° C. (preferably 50° to 70° C.) until addition is completed, and then conducted at a temperature of from about 55° C. to reflux (preferably 70° C. to reflux) until condensation is completed, to form a resole resin. When the resin is to be used for wood laminate adhesion, it is preferred that condensation be conducted until a viscosity of from 300 to 1,500, preferably from about 450 to about 800, cps at 25° C. is obtained. Where the resin is to be used as a bonding agent for particle or strand board, it is preferred that condensation be conducted until a viscosity of from 250 to 800, preferably from about 300 to about 400, cps at 25° C. is obtained.

Because the extract is already sufficiently alkaline, it usually can be reacted directly with the aldehyde without the need for adding additional alkaline catalyst, at the above temperatures and under normal pressure, although it is possible to adjust the alkaline concentration to from 2 to 20, preferably 3 to 15, percent by weight.

RESIN II is used herein to designate a conventional phenol-aldehyde (formaldehyde) resin, in which there is no substitution for the phenol by the extracts of this invention, except as specifically indicated.

Unless stated otherwise, the condensation conditions for Resin I also apply to Resins III, III-A, IV and V, although a final viscosity of from 20 to 1,500, especially 20 to 500, cps at 25° C. is desirable where the resin is to be used for the impregnation of cellulosic materials, such as paper, canvas and wood pulp.

RESIN III is a physical mixture of 1.0 part by weight of RESIN I (type B) and up to 4.0 parts by weight of RESIN II (type B) which mixture is then applied as a bonding agent or used in a laminate adhesive, and heat cured.

RESIN III-A is a physical mixture of 1.0 part by weight of RESIN I (type A or early type B) and up to 4.0 parts by weight of RESIN II (type A or early type B), with additional aldehyde optionally added if necessary for polymerization to a desired viscosity, which is then, after thorough mixing, heated together at from 55° C. to reflux so as to form a thermosetting type B copolymer, useful as an adhesive ingredient and as a bonding agent.

RESIN IV is one similar to RESIN I but in which up to 80%, preferably up to 60%, more preferably up to 40%, of the extract is replaced by a phenol, preferably having at least two free active sites, and the mixture then reacted with an aldehyde under conventional alkaline conditions, to produce a type B resin copolymer. Depending upon the amount of replacement of the alkaline concentrate, additional alkali should be added so that the total amount of alkali during the condensation process is from about 2 to about 20% by weight.

RESIN V is a phenol-aldehyde type resin, consisting essentially of the reaction product of from up to about 4.0 parts by weight of a conventional thermosetting phenol-aldehyde resin which is a RESIN II precondensate (type A or early type B) having a viscosity of from about 20 to about 800 cps at 25° C. and about 1.0 part by weight of the solids of the alkaline or sulfite extract. The reaction results in further polymerization can best be conducted in an aqueous alkaline system in which the alkali concentration is adjusted to from about 2 to about 20%, preferably 3 to 15%, by weight, and at a temperature of from 30° C. to reflux, until a viscosity of from 20 to 3,000 cps at 25° C. is reached. Additional alkali may be added to adjust the concentration to the desired value, depending upon the type and amount of extract that is used. Additional aldehyde also may be added to produce a desired polymer viscosity.

EXAMPLE 1

Two-Stage Alkaline Extraction 160 g (calculated as bone dry) of peanut hull having a particle size of less than 0.3 cm was charged to a 2,000 cc Erlenmeyer flask. Then 1,600 g of 5% NaOH aqueous solution was added. The ingredients were mixed well by shaking the flask. The flask was then placed in a gravity convection oven and heated at a temperature of 90°–95° C. for about 17 hours. The contents of the flask were vacuum filtered using Whatman #4 filter paper, to remove non-suspended solid particle residue. The filtrate was put aside and stored at room temperature. The residue was subjected to a second extraction using the same equipment, by the addition of 1,280 g of fresh 5% NaOH aqueous solution and again heated in the convection oven at 90°–95° C. for about 17 hours. The filtration process was repeated and the two filtrates were mixed. The filtrate residue was dried and reserved. The filtrate was concentrated by placing it in an open beaker in a forced air oven maintained at 90°–95° C. for several days until a solids concentration of about 40% by weight was reached.

The above process was repeated several times, and the alkaline extracts were mixed together, until a sufficient amount was prepared to conduct various resin syntheses.

EXAMPLES 2–11

Additional Two-Stage Alkaline Extractions

Additional extractions were conducted varying the alkaline concentration, the temperature, and the raw material from which the extract was to be derived. The alkaline solution: raw material ratio was 10:1 for the first step and 8:1 for the second step, as follows.

TABLE I

| Example No. | Raw Material | Temperature (°C.) | Alkaline Concentration (%) |
|---|---|---|---|
| 2 | peanut hull | 40 | 2 |
| 3 | peanut hull | 40 | 10 |
| 4 | peanut hull | 95 | 2 |
| 5 | peanut hull | 95 | 10 |
| 6 | pecan pith | 40 | 2 |
| 7 | pecan pith | 40 | 5 |
| 8 | pecan pith | 40 | 10 |
| 9 | pecan pith | 95 | 2 |
| 10 | pecan pith | 95 | 10 |

TABLE I-continued

| Example No. | Raw Material | Temperature (°C.) | Alkaline Concentration (%) |
|---|---|---|---|
| 11 | peanut hull | 95 | 5; 10* |

*In this particular example, the first stage was at a 5% concentration and the second was at a 10% concentration.

EXAMPLE 12

Three-Stage Alkaline Extraction

Example 1 was repeated except that the NaOH concentration was 2% and the filtrate residue was subjected to a third extraction stage using the same equipment, by the addition of 960 g of fresh 2% NaOH aqueous solution and again heated in the convection oven at 90°–95° C. for about 17 hours followed by filtration. The filtrates from the three steps were mixed together.

EXAMPLE 13

Extraction by Neutral Sulfite Pulping Method

An extract was prepared using a sealed pressure vessel equipped with a stirrer, a thermocouple, a cooling coil and a pressure gauge, and having a capacity of about 1,200 cc. This vessel was charged with 100 g (calculated as bone dry) of peanut hull reduced to 0.3 cm or less particle size, and 600 g of an aqueous solution containing 3.9% by weight of sodium sulfite and 1.0% by weight of sodium carbonate. The vessel was heated to about 170° C. with constant stirring, and maintained at the temperature for 6 hours. The vessel was then cooled so as to stop the extraction process. The contents were then vacuum filtered through Whatman #4 filter paper, and the extract residue set aside. The filtrate was then concentrated with a flash evaporator at about 60° C. until a solids concentration of about 30% by weight was reached.

EXAMPLE 14

Extraction by Neutral Sulfite Pulping Method

The process of Example 12 was repeated, using pecan pith instead of peanut hulls.

ANALYSIS OF EXTRACT COMPONENTS

Extracts of various raw materials, both within and outside the scope of the subject invention, were analyzed as follows.

The ash content was obtained after heating a sample of the extract at 600° C. for 2 hours. The analysis of the other components was as follows:

(a) Nitrogen analysis was conducted on a portion of the extract.
(b) The extract was neutralized with HCl (pH of 3).
(c) The neutralized product was vacuum evaporated (less than 10 mm Hg, 2–3 hours).
(d) Volatile matter was not analyzed.
(e) Ether extraction was conducted on a portion of the evaporated residue (reflux, 10 hours). This extract was evaporated so as to perform an analysis of crude fat.
(f) The extract residue obtained in (e) was further extracted with chloroform, and the chloroform extract was analyzed. As a result, aromatic, carboxylic, and methyl moieties were found. The residue of the chloroform extract was further extracted with ethanol and the ethanol extract was analyzed. An analysis showed the presence of phenolic and carboxylic acid moieties. The residue after ethanol extraction was not analyzed.
(g) A portion of the neutralized product of step (a) was boiled in sulfuric acid (reflux, 30 minutes), then boiled in NaOH (reflux, 30 minutes), and then was filtered. The filtrate was not analyzed, but the residue was analyzed for cellulose and organic matter.

The results of the above analyses are as follows:

TABLE II

| | Extract Analyses As Percentage Of Total Solids | | | | | | |
|---|---|---|---|---|---|---|---|
| Component | Peanut Hulls 5% NaOH, 95° C. | Peanut Hulls 10% NaOH, 95° C. | Pecan Pith 10% NaOH, 95° C. | Redwood Bark 5% NaOH, 95° C. | Redwood Bark 10% NaOH, 95° C. | So. Pine Bark 5% NaOH, 95° C. | So. Pine Bark 10% NaOH, 95° C. |
| Sodium | 44.0 | 47.6 | 27.9 | 26.3 | 25.6 | 29.0 | 20.1 |
| Ash | 91.9 | 93.7 | 66.6 | 62.4 | 79.7 | 72.0 | 77.0 |
| Nitrogen | 0.4 | 0.34 | 0.5 | 0.07 | .055 | 0.13 | .05 |
| Crude Protein (Nitrogen × 6.25) | 2.4 | 2.1 | 2.9 | 0.4 | .34 | 0.8 | .31 |
| Crude Fat (Ether Extract) | 0.7 | 0.3 | 0.5 | 3.1 | — | 7.6 | — |
| Crude Fiber | 0.1 | 0.1 | 0.5 | >0.1 | — | >0.1 | — |
| Lignin | >0.1 | >0.1 | >0.1 | >0.1 | — | >0.1 | — |
| Silica | 1.1 | >0.1 | >0.1 | >0.1 | — | >0.1 | — |
| Chloroform Extract* | 0.7 | 0.4 | 0.3 | 0.4 | — | 2.3 | — |
| Ethanol Extract | 4.2 | 10.5 | 5.7 | 26.2 | — | 24.8 | — |

*aromatic, carboxylic, and methyl moieties were identified

An analysis of the crude protein as a percentage of the total organics extracted is as follows:

TABLE III

| Extract (Example) | Crude Protein As Percentage Of Organics Extracted |
|---|---|
| Peanut Hull - 5% NaOH, 95° C. (Ex. 1) | 10.2 |
| Peanut Hull - 10% NaOH, 95° C. (Ex. 5) | 12.2 |
| Pecan Pitch - 10% NaOH, 95° C. (Ex. 10) | 5.6 |
| Southern Pine Bark - 5% NaOH, 95° C. | 1.6 |
| Southern Pine Bark - 10% NaOH, 95° C. | 0.5 |
| Redwood Bark - 5% NaOH, 95° C. | 0.7 |
| Redwood Bark - 10% NaOH, 95° C. | 0.6 |

A comparison of the analytical data for the various extracts indicates that the only significant difference is in crude protein. It is believed that the presence of larger amounts of crude protein in peanut hull and pecan pith than in southern pine or redwood bark is at least partially responsible for the improved resins produced according to the subject invention. It is entirely possible that the protein acts as a catalyst to increase cross-linking of the phenolic copolymer, which would explain the shortened press time that can be achieved with the subject invention. This explanation, however, is only theoretical.

EXAMPLE 15

Preparation of Resin I for Use in Plywood

A 5,000 cc glass resin reaction kettle (manufactured by S.G.A. Scientific Co., Bloomfield, N.J., USA) equipped with a thermometer, internal cooling coil, stirrer, and reflux condenser was used. To this reaction kettle was charged: an extract which was a mixture of 400 g of the extract of Example 1 (having 50.55% solids) and 3,432 g of the extract of Example 4 (having 34.53% solids), and which had been partially concentrated by the removal of excess water; and 568 g of 95% paraformaldehyde; with continual stirring. While maintaining the stirring throughout the condensation reaction, the temperature of the kettle was raised to 60°±5° C. and maintained for 90 minutes. The temperature was then raised to from 80° C. to reflux with continual stirring, until the viscosity reached 110 cps at 25° C. as measured by a Brookfield Viscometer, using a No. 2 spindle at 30 rpm with a factor of 10. A typical adhesive formula, as disclosed herein, was then prepared and the adhesive was used in the manufacture of plywood panels in the manner described herein.

EXAMPLE 16

Preparation of Resin III-A for Use in Plywood

A Resin I precondensate was prepared using the same reaction kettle as in Example 15. To this kettle were charged 2,252 g of the extract of Example 11 (having 58.8% solids); 578 g of 95% paraformaldehyde; and 1,170 g of water; with continual stirring. While maintaining the stirring throughout the condensation reaction, the temperature of the kettle was raised to 60°±5° C. and maintained for 90 minutes. This formed a Resin I precondensate. The reaction was discontinued at this point and the Resin I precondensate set aside.

A Resin II precondensate was prepared using the same glass reaction kettle, which was charged with 1,545 g of 90% phenol (Dow Chemical Company); 888 g of 95% paraformaldehyde; 2,349 g of water; and 119 g of 50% NaOH; with continual stirring. While maintaining the stirring throughout the condensation reaction, the temperature was raised to 60°±5° C. and maintained for 90 minutes, to form a Resin II precondensate, which was set aside without any further condensation.

In order to make a Resin III-A type copolymer, 1,487 g of the Resin I precondensate prepared above (40% extract) and 2,600 g of the Resin II precondensate prepared above (60% phenol) were charged to the 5,000 cc glass resin reaction kettle used above and thoroughly mixed. The temperature was then raised to from 80° C. to reflux with continual stirring, until the viscosity reached 338 cps at 25° C. as measured by a Brookfield Viscometer using a No. 2 spindle at 30 rpm, with a factor of 10. The copolymer so produced was suitable for use in an adhesive formulation for plywood. Based upon test results using this resin, it is believed preferable that the final condensation reaction be continued until a viscosity of at least 450 ±50 cps is reached.

EXAMPLE 17

Preparation of Resin IV for Use in Plywood

The same glass resin reaction kettle as used in the previous examples was used. To this reaction kettle was charged 2,087 g of the extract of Example 1 (42.8% solids, 60% extract) and 661 g of 90% phenol (40% phenol); 799 g of 95% paraformaldehyde; and 1,253 g of water; with continual stirring. While maintaining the stirring throughout the condensation reaction, the temperature of the kettle was raised to 60°±5° C. and maintained for 90 minutes. The temperature was then raised to from 80° C. to reflux, with continual stirring, until the viscosity reached 450±50 cps at 25° C. as measured by a Brookfield Viscometer, using a No. 2 spindle at 30 rpm, with a factor of 10. This resin was then used in the standard formula given below to prepare an adhesive mixture suitable for plywood manufacture.

EXAMPLE 18

Preparation of Resin IV for Use in Particle Board

A resin was prepared in the same manner as Example 17 except using 2,858 g of the extract of Example 1, (37.5% solids, 60% extract); 793 g of 90% phenol (40% phenol); 1,079 g of 95% paraformaldehyde; and 521 g of water. The reaction was continued until a final viscosity of about 350 cps was reached. This resin was suitable for use as a bonding agent in particle board without further preparation. The resin had a higher solids content and a lower water content than those resins to be used for plywood manufacture, because this is generally preferred for the manufacture of particle board.

EXAMPLES 19–33

Additional resins were prepared in accordance with Example 17 when for use in plywood and Example 18 when for use in strand (particle) board, except using the following extracts, substituted for phenol, in the following percentages. As shown in Tables IV and V below, the resin compositions can contain 80 to 20% extract and 20 to 80% phenol. The resins for use in plywood manufacture were prepared as adhesives using the formula disclosed herein.

TABLE IV

| Examples 19–30 - Preparation of Resins for Plywood | | |
|---|---|---|
| Resin Example | Extract Used (Example) | Phenol Replacement (%) |
| 19 | 2 | 40 |
| 20 | 3 | 40 |
| 21 | 4 | 40 |
| 22 | 5 | 40 |
| 23 | 6 | 40 |
| 24 | 7 | 60 |
| 25 | 8 | 40 |
| 26 | 9 | 40 |
| 27 | 10 | 40 |
| 28 | 12 | 40 |
| 29 | 13 | 20 |
| 30 | 14 | 40 |

TABLE V

| Examples 31–33 - Preparation of Resins for Particle Board | | |
|---|---|---|
| Resin Example | Extract Used (Example) | Phenol Replacement (%) |
| 31 | 1 | 80 |
| 32 | 5 | 40 |

TABLE V-continued

Examples 31-33 - Preparation of Resins for Particle Board

| Resin Example | Extract Used (Example) | Phenol Replacement (%) |
|---|---|---|
| 33 | 8 | 40 |

EXAMPLE 34

Preparation of Resin V for Use in Plywood

A Resin II precondensate was first prepared using the same glass resin reaction kettle as in the previous examples. Under continual stirring, 963 g of 90% phenol, 805 g of paraformaldehyde, 1,724 g of water and 74 g of 50% NaOH were charged and a precondensate was formed by raising the temperature of the kettle to 60°±5° C. for 90 minutes, under continual stirring. The heating was interrupted at this point and 983 g of the extract of Example 11 (58.8% solids) and 251 g of water were added, with continual stirring. The heating was then resumed under continual stirring and the temperature was raised to from 80° C. to reflux, until the viscosity reached about 400 cps at 25° C. as measured by a Brookfield Viscometer, using a No. 2 spindle at 30 rpm with a factor of 10. The resin so produced was used in the disclosed adhesive formula and was found suitable for the manufacture of plywood.

COMPARATIVE EXAMPLE C-1

A two-stage alkaline extract was prepared according to Example 1, except that the raw material was coarsely ground redwood bark, the alkaline solution was a 5% concentrate, and the extraction was conducted at about 95° C. This extract was then used to make a Resin IV type copolymer adhesive for plywood with a 60% replacement of phenol by the extract, similar to Example 17.

COMPARATIVE EXAMPLE C-2

A resin was prepared according to Comparative Example C-1 except that the alkaline concentration was 10% and that 40% of the phenol was replaced by the extract.

COMPARATIVE EXAMPLE C-3

A resin was prepared according to Comparative Example C-1 except that the raw material was coarse oak bark, the alkaline concentration was 2%, the extraction was conducted at 40° C., and 40% of the phenol was replaced by the extract.

COMPARATIVE EXAMPLE C-4

A resin was prepared according to Comparative Example C-3, except that the extraction was conducted at 95° C.

COMPARATIVE EXAMPLE C-5

A resin was prepared according to Comparative Example C-1 except that the raw material was coarse southern (yellow) pine bark, the alkaline concentration was 2%, the extraction was conducted at 95° C., and 40% of the phenol was replaced by the extract.

COMPARATIVE EXAMPLE C-6

A resin was prepared according to Comparative Example C-5 except that the alkaline concentration was 10%.

COMPARATIVE EXAMPLE C-7

An adhesive was prepared according to Comparative Example C-6 except that the extraction was conducted at 40° C.

COMPARATIVE EXAMPLE C-8 (Plywood Control)

As a control, plywood was manufactured in the same manner as the examples of this invention, except using a commercially available 100% phenol-formaldehyde resin, having a solids content of 40%, a NaOH content of 5.4%, a viscosity of 937 cps at 25° C. measured with a Brookfield Viscometer using a No. 2 spindle at 30 rpm and a factor of 10, and having 0.08% of free formaldehyde.

COMPARATIVE EXAMPLE C-9

(Strand Board Control)

As a control, strand (particle) board was manufactured in the same manner as the examples of this invention using a commercially available 100% phenol-formaldehyde resin having a solids content of 45.6%, a pH of 12.1 measured on a glass electrode pH meter (mgd. by Hitachi Horiba Co., Japan), and a viscosity of 346 cps measured on a BL Type Visco Tester, according to Japanese Industrial Standard K-6838 (1970).

COMPARATIVE EXAMPLE C-10

(Strand Board Control)

As a second control, strand (particle) board was manufactured in the same manner as Example C-9 except using a different commercially available 100% phenol-formaldehyde resin having a solids content of 36.7%, a pH of 11.4, and a viscosity of 247 cps, both values measured in the same manner as in Example C-9.

4. Preparation of an Adhesive for Plywood Manufacture

For all of the plywood specimens manufactured for the purposes of this invention, the following adhesive composition was used.

| Ingredient and Mix Detail | Proportion By Weight |
|---|---|
| Water (tap water as received) | 18.0% |
| Regular grind Phenofil (1) | 10.2% |
| GLU-X Wheat Flour (2) | 3.9% |
| (Mix one minute) | |
| Resin to be tested | 7.7% |
| (Mix one minute) | |
| 50% NaOH solution | 3.6% |
| (Mix twenty minutes) | |
| Resin to be tested (3) | 56.5% |
| (Add slowly for smooth, lump-free mix) | |
| Total Ingredients | 100.0% |
| Total resin solids in mix, based on 40% | |

-continued

| Ingredient and Mix Detail | Proportion By Weight |
|---|---|
| nonvolatile content in liquid resin | 25.7% |

Notes:
(1) a furfural derivative which is a product of Lufkin Pecan Co., Lufkin, Texas, U.S.A.
(2) a product of Robertson Corp., Brownstown, Indiana, U.S.A.
(3) the resin is added in two steps, and totals 64.2% of the entire adhesive composition.

5. Veneer Preparation and Application of Adhesive Composition

Commercial southern pine veneer of one-eighth inch (0.3 cm) thickness was obtained from a middle Georgia mill and cut into 12"×12" (30 cm×30 cm) sheets and used to make 3-plywood panels. Prior to usage in panel production, the veneer was checked to assure conformance to a thickness tolerance of ±0.005 inches (1.3 mm) from the stated value. The adhesive composition was applied using a roller spreader (Black Brothers Co., Mendota, Ill., U.S.A.) and controlled within the range of 83–87 pounds per 1,000 square feet of double glue line (lb./MDGL) [equivalent to approximately 41.6 g/1,000 cm$^2$]. After spreading, all panel layups were stored in a gravity convection oven at 100° F. (40° C.) for assembly time periods of 20 and 60 minutes. No prepressing was done, but during assembly time, the layups were stored under a slight deadload to prevent edge lifting. The moisture content of the veneer was approximately 4 to 7%. The 3-ply layups were then hot pressed, one panel per opening, for the various press times, as indicated in Table VI, using a platen temperature of 300° F. (149° C.) and a panel pressure of 200 psi (about 14 kg/cm$^2$). Immediately upon removal from the hot press, the panels were stored in an insulated but unheated oven for an overnight period to simulate hot stacking.

6. Testing of Plywood

Testing of the panels was carried out in accordance with the vacuum-pressure plywood shear method, as described in U.S. Department of Commerce Standard PS1-74. Upon completion of the hot stacking period, the panels were brought to room temperature and cut into three 3¼" (8.26 cm) wide strips, as measured along the face grain axis. The center strip was held in reserve and the two outside strips each cut to yield eight standard plywood shear specimens. The grooving of these two strips was such that, when tested, the specimens were balanced with regard to the effective opening and closing of lathe checks. A total of 12 specimens from each panel, six selected at random from each strip group of eight, were tested according to the vacuum-pressure procedure for exterior glue lines, as outlined in the standard. The figures for wood failure, as shown in the following table, each represent the average of 24 specimens, 12 taken from each of two duplicate panels.

The data in Table VI should be viewed by comparison with the resin of Example C-8, which is a commercial resin used as the control. The manufacturer of this resin recommends a minimum hot press time of 3 minutes, but a hot press time of 4 minutes is generally used for commercial production. It should be noted that many of the resins of the subject invention achieve an acceptable result after only 2 minutes of hot press time, as contrasted with the control resin.

TABLE VI

Plywood Shear Test Data According To PS1-74
Percentage of Wood Failure for Various Hot Press Times and Assembly Times as Indicated

| Resin Used (Example No.) | Hot Press - 1.5 min. | | Hot Press - 2 min. | | Hot Press - 3 min. | | Hot Press - 4 min. | |
|---|---|---|---|---|---|---|---|---|
| | 20 min. Assembly | 60 min. Assembly | 20 min. Assembly | 60 min. Assembly | 20 min. Assembly | 60 min. Assembly | 20 min. Assembly | 60 min. Assembly |
| C-8 | 0 | 0 | 0 | 69 | 77 | 92 | 93 | 91 |
| 15* | — | — | delaminated | delaminated | delaminated | 0 | 5 | 12 |
| 16 | 60 | 60 | 84 | 87 | 90 | 95 | — | — |
| 17 | 25 | 69 | 82 | 85 | 89 | 90 | — | — |
| 19 | — | — | 85 | 61 | 84 | 71 | 83 | 56 |
| 20 | — | — | 88 | 68 | 89 | 75 | 85 | 41 |
| 21 | — | — | 85 | 68 | 89 | 82 | 85 | 80 |
| 22 | — | — | 85 | 76 | 92 | 90 | 88 | 78 |
| 23 | — | — | 24 | 93 | 56 | 88 | 68 | 97 |
| 24 | 0 | 31 | 79 | 74 | 65 | 90 | — | — |
| 25 | — | — | 90 | 90 | 88 | 90 | 91 | 83 |
| 26 | — | — | 80 | 88 | 83 | 90 | 83 | 87 |
| 27 | — | — | 75 | 68 | 90 | 65 | 84 | 61 |
| 28 | — | — | — | — | — | — | 91 | 41 |
| 29 | — | — | — | — | — | — | 64 | 82 |
| 30 | — | — | 61 | 76 | 77 | 78 | 67 | 67 |
| C-1 | — | — | 57 | 25 | 48 | 35 | — | — |
| C-2 | — | — | 56 | 27 | 62 | 35 | — | — |
| C-3 | — | — | 49 | 83 | 68 | 88 | 76 | 86 |
| C-4 | — | — | 5 | 81 | 68 | 80 | 61 | 82 |
| C-5 | — | — | 66 | 92 | 85 | 90 | 72 | 81 |
| C-6 | — | — | 74 | 71 | 90 | 64 | 91 | 72 |
| C-7 | — | — | 86 | 68 | 85 | 43 | 85 | 45 |

*The poor results for Example 15, which was intended to be within the scope of this invention, are believed to be caused by insufficient polymerization, since the viscosity achieved of about 110 cps at 25° C. was too low, and the polymerization should have continued until a viscosity as disclosed in the detailed discussion of Resin 1 was reached.

It also should be noted that, in industrial production, the assembly time is generally around 20 minutes. The 60-minute assembly time was used to see whether delays in assembly could be tolerated using the various resins. Of interest is that, in some instances, a 60-minute assembly time produces a lower percentage of wood failure, which indicates that the adhesive is less successful after the time delay. This may be explained by dryout of the glue line. In Table IV, a higher number is desirable.

The resin of Example 23 is particularly useful because of the excellent results for 60-minute assembly times. When a highly absorbent veneer, such as southern (yellow) pine or a tropical hardwood is used, or when assembly is in a hot atmosphere, dryout of the glue line is very common. The excellent 60-minute assembly time results of Example 23 indicate that this resin has excellent dryout resistance. The poor result for 20 minutes assembly can be improved by adjusting the resin viscosity upwards during polymerization, and adjusting the formula of the adhesive composition.

7. Use of Resins in Strand (Particle) Board Manufacture (for testing)

Douglas fir lumber was made into strands by a shaving machine, each strand having a width of 5–10 mm, a thickness of 0.3–0.5 mm, and a length of 50–75 mm. The strands were placed in a dryer and dried until their moisture content became less than 3%. The strands were then placed in a blender and the resins were sprayed on the strands, giving a relatively uniform application. The strands were then placed on a stainless steel plate 40 cm × 40 cm so that all of the strands were substantially parallel and formed a first layer 30 cm × 30 cm of 2 mm thickness. Then additional parallel strands were placed upon, and at right angles to, the strands of the first layer, to form a second (core) layer of 8 mm thickness. Then a third layer of parallel strands at right angles to the core layer was placed upon the core layer at a thickness of 2 mm. The mat thus formed was heat compressed at 180° C. and 30 kg/cm² pressure, followed by cooling, using various press times as indicated in Table VII. The resins to be tested all were applied at the rate of 5% of resin solids per 100% by weight of bone dry wood.

8. Testing of Strand (Particle) Board

The strength of the internal bond of the strand board was measured in accordance with ASTM-D-1037 (64). Each of the values in Table VII is an average of six specimens conducted upon two pieces from each of three different boards.

bond, even after only 2.5 minutes of press time, whereas most other resins are inoperative. After a press time of only three minutes, all of the resins of the subject invention form acceptable strand (particle) boards, whereas the board using a conventional resin (Example C-9) still delaminates. Furthermore, it should be noted that the internal bond strength of a strand board formed using Example C-9 is still inadequate even after 3.5 minutes and, in fact, requires a full four minutes of press time. By contrast, the resins of Examples 18, 32 and 33 of the subject invention are superior after only 3 minutes, to the resin of Example C-9 after 4 minutes, and the resin of Example 31 of the subject invention is also acceptable. From the above, it must be quite clear that the resins of the subject invention permit a savings of up to 37.5% of press time, resulting in a corresponding savings of energy and a corresponding reduction of press capacity required for production. The results for the second standard commercial resin (Example C-10) are even more inferior, and indicate that there is no bonding at all until at least 4 minutes press time.

TABLE VIII

| MOR (Modulus or Rupture) of Strand Board According to JIS A-5908, After Boiling for Two Hours in Water | | | | | | | | | | | | | |
|---|---|---|---|---|---|---|---|---|---|---|---|---|---|
| Average of 6 Specimens (kg/cm²) | | | | | | | | | | | | | |
| Example C-9 Press Time (min.) | | | Example C-10 Press Time (min.) | | | | Example 33 Press Time (min.) | | | Example 32 Press Time (min.) | | | |
| 3.0 | 3.5 | 4.0 | 2.5 | 3.0 | 3.5 | 4.0 | 3.0 | 4.0 | 5.0 | 3.0 | 4.0 | 5.0 |
| 59 | 133 | 126 | * | * | * | 98 | 113 | 118 | 127 | 99 | 108 | 121 |

Note:
* means delamination of board and test discontinued

Comparing the values in Table VIII for three minutes of press time clearly shows the superiority of Examples 32 and 33 over Comparative Example C-9. The values for Examples 32 and 33 may be considered as acceptable for strand (particle) board, while the value for Comparative Example C-9 clearly is insufficient, and will result in disintegration of the board during use. The results for the second standard commercial resin (Example C-10) and even more inferior, and indicate that there is no bonding at all until at least 4 minutes press time.

9. The Importance of Reduction of Press Time in Plywood and Particle Board Manufacture On the average, processing of plywood takes about 20 minutes from the first application of adhesive up to the point of hot press. At that point, a bottleneck in production occurs, because normal hot pressing takes at least 3 minutes and frequently 3.5 minutes or more for a 3-ply three-eighths inch (approximately 0.95 cm) thick board, using a conventional phenolaldehyde resin. To

TABLE VII

| Internal Bond Strength- Test of Strand Board According to ASTM-D-1037 (64) - Average of 6 Specimens (kg/cm²) | | | | | | | | | | | | | | | | | | |
|---|---|---|---|---|---|---|---|---|---|---|---|---|---|---|---|---|---|---|
| Example C-9 Press Time (min.) | | | | Example C-10 Press Time (min.) | | | | Example 33 Press Time (min.) | | | | Example 32 Press Time (min.) | | | | Example 18 Press Time (min.) | | Example 31 Press Time (min.) | |
| 2.5 | 3.0 | 3.5 | 4.0 | 2.5 | 3.0 | 3.5 | 4.0 | 2.5 | 3.0 | 4.0 | 5.0 | 2.5 | 3.0 | 4.0 | 5.0 | 3.0 | 4.0 | 3.0 | 4.0 |
| * | * | 0.46 | 2.96 | * | * | * | 2.0 | * | 4.3 | 5.7 | 5.3 | 2.8 | 5.6 | 6.5 | 6.2 | 4.1 | 4.5 | 2.2 | 3.1 |

Note:
* means delamination of board and test discontinued

Table VII cleary shows the superiority of the resins of the subject invention (Examples 18, 31, 32 and 33) over a standard commercial resin (Example C-9). The resin of Example 32, in particular, forms an acceptable eliminate the bottleneck would require additional hot press capacity, which would be extremely costly and also would consume more energy. Therefore, a reduction of the time for hot pressing will result in a substantial money and energy savings. Many of the resins of this invention can be fully cured in 2 or 2.5 minutes of hot press time, thus saving from 33 to 50% of the energy expenditure and correspondingly lower capital investment.

In the manufacture of particle board, strand board, hardboard, or any synthesized cellulosic product of similar nature, the time savings is even more important, because such boards are often thicker than plywood and often require an even longer press time. Thus, the rapid thermosetting resins of the subject invention save even more time and energy in absolute terms.

10. Use of Resins in Molding Powders

When the resins of the subject invention are used for molding, the molding powder consists of type B resin (40–50%), a filler (35–50%), optionally a plasticizer (5%), and small amounts of lubricant and pigments. The powder can be cured in a mold at 120°–185° C. under a pressure of 2,000 pounds per square inch or more. In the standard one-stage process for the manufacture of resin for laminated materials and for lacquers, 1.0 mole of phenol and 1.5 moles of formaldehyde (usually 40% solution) and a basic catalyst are heated. After a few hours, the mixture settles into two layers. After removal of the upper water layer, more water is eliminated by heating in a vacuum. Then the resulting syrup is poured into shallow pans to cool, producing a type B resin, soluble in alcohol. Molding powders are usually made by the two-stage process.

Useful laminated products can be made from such resins and paper, canvas, fibers, and wood.

11. Preparation of Novolak Resins

Although this invention is primarily directed towards alkaline phenol-formaldehyde resins that are thermosetting, it is also possible to make novolak (thermoplastic) resins using the extracts of this invention under certain conditions. Where the alkaline extraction method is used, alkaline salts generally remain in the concentrated extract, and therefore, such extracts are logically most easily used in preparing an alkaline catalyst phenol-aldehyde resin. However, it is chemically possible to neutralize the alkali and use the extract in reaction with aldehyde under acid conditions, to produce a novolak-type resin. This can be accomplished particularly easily where ammonium hydroxide aqueous solution is used as the extracting agent. In this instance, the ammonia remaining in the extract can be removed by simply evaporating the water using any conventional process, so that the dry powder remaining is essentially neutral or only slightly alkaline. Even where the extract is concentrated with some water remaining, removal of the water by evaporation will tend to remove a great deal of the ammonium hydroxide, since ammonium hydroxide is more volatile than water. Thus, an alkaline extract prepared using ammonium hydroxide aqueous solution easily can be used in the preparation of novolak resins, using conventional catalysts and proportions of extract and aldehyde for the production of this type of resin. The proportions of phenol to the extract of this invention can be the same as those disclosed for the preparation of alkaline catalyst resins and the manner of preparing the resins can be essentially the same as that disclosed in the examples and specification of this invention, with appropriate changes of alkalinity/acidity, aldehyde:phenol: extract ratio, temperature, etc., applied mutatis mutandis to the production of novolak resins.

Since an extract prepared using the sulfite pulping method is not strongly alkaline, such extracts also would be useful in the preparation of novolak resins in the same manner as alkaline resins prepared according to this invention which either have been neutralized or which have had the ammonium hydroxide removed.

It also would be possible to produce a novolak or seminovolak resin by replacing part of the extract with a substitutued phenol containing only one free active site, for example 2,4-xylenol. Replacement of part of the extract with a phenol having two free active sites, such as ortho- or para-cresol, can produce a partially or slowly curable resin.

Additionally, a novolak resin can be made by replacement of the extract with a phenol having three free active sites, provided that the amount of aldehyde used is substantially reduced.

I claim:

1. A phenol-aldehyde resin consisting essentially of the reaction product of up to 4.0 parts by weight of a conventional thermosetting phenol-aldehyde resin precondensate having a viscosity of from 20 to 800 cps at 25° C., and 1.0 part by weight of an alkali organic extract of pecan piths, said extract containing phenolic compounds and at least 2% by weight of crude protein, based on weight of said extract, wherein the mixture is polymerized in an aqueous alkaline system at a temperature of from 30° C. to reflux, until a viscosity of from 20 to 3,000 cps at 25° C. is reached.

2. The resin composition of claim 1 wherein the polymerization is carried out in an aqueous alkaline system containing from 2 to 20% alkali concentration by weight.

3. A phenol-aldehyde resin composition consisting of essentially of the polymerization product of
   (a) one part by weight of an alkali organic extract of pecan piths, said extract containing phenolic compounds and at least 2% by weight of crude protein, based on weight of said extract, and
   (b) 0.1 to 1.6 parts by weight, based on weight of said extract, of an aldehyde.

4. A phenol-aldehyde type resin composition consisting essentially of 1.0 parts by weight of the resin of claim 3 in physical mixture with up to 4.0 parts by weight of a conventional thermosetting phenol-aldehyde resin.

5. A phenol-aldehyde resin consisting essentially of from 1.0 part by weight of the resin of claim 3 which has been polymerized to a precondensate having a viscosity of not more than 800 cps at 25° C., and which has been physically mixed with up to 4.0 parts by weight of a conventional thermosetting phenol-aldehyde resin precondensate having a viscosity of from 20 to 800 cps at 25° C., and wherein the mixture is further polymerized to form a copolymer resin.

6. The resin of claim 3 in which up to about 80% by weight of the extract composition is replaced by a phenol having at least 2 free active sites.

7. The resin of claim 3 wherein the aldehyde is selected from at least one of the group consisting of formaldehyde, para-formaldehyde, trioxane, hexamethylene tetramine, furfuraldehyde, and formalin.

8. The composition of claim 6 wherein the phenol is selected from at least one of the group consisting of phenol, cresol, xylenol, and resorcinol, all having at least 2 free active sites.

9. The composition of claim 6 wherein polymerization is conducted at a temperature of from about 30° to about 75° C., until addition is completed, and then continued at a temperature of from about 55° C. to reflux until condensation is completed.

10. The resin of claim 6 wherein not more than 60% of the alkaline extract is replaced by phenol.

11. The resin of claim 6 in which the alkali concentration during polymerization is adjusted to from 3 to 15% by weight.

12. A phenol-aldehyde cellulosic material impregnation resin consisting essentially of the resin of claim 3, polymerized to a viscosity of from 20 to 1,500 cps at 25° C.

13. The phenol-aldehyde resin composition of claim 3 wherein the alkali of said organic extract is a member selected from the group consisting of sodium and potassium.

14. The phenol-aldehyde resin composition of claim 3 wherein the alkali of said organic extract is ammonium.

15. The phenol-aldehyde resin composition of claim 3 wherein said extract contains at least 5% by weight of crude protein.

16. The phenol-aldehyde resin composition of claim 3 wherein the polymerization of said organic extract and aldehyde is carried out in an aqueous alkaline system.

17. The phenol-aldehyde resin composition of claim 3 wherein the polymerization of said organic extract and aldehyde is carried out in an aqueous acid system.

18. The phenol-aldehyde resin composition of claim 3 wherein the polymerization is carried out in an aqueous alkaline system at a temperature of 30° C. to reflux, until a viscosity of from 20 to 1,500 cps at 25° C. is reached.

19. The phenol-aldehyde resin composition of claim 3 wherein the polymerization is carried out in an aqueous alkaline system at a temperature of 30° C. to reflux, until a viscosity of from 250 to 1,500 cps at 25° C. is reached.

20. The resin composition of claim 3 wherein 20 to 80% by weight of said extract is replaced by phenolic compounds.

* * * * *